United States Patent Office 2,703,899
Patented Mar. 15, 1955

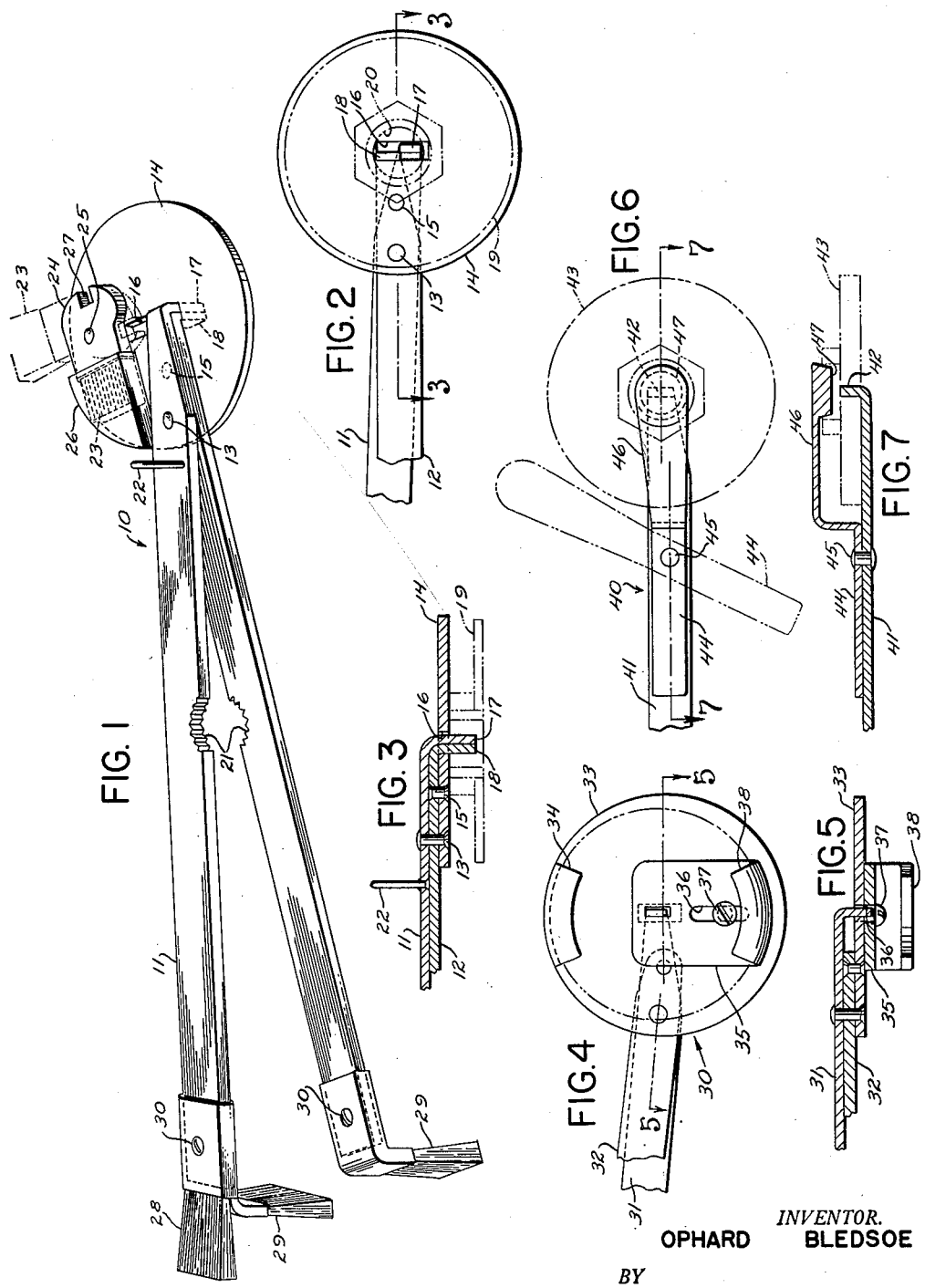
INVENTOR.
OPHARD BLEDSOE

2,703,899

CLEANER DEVICES

Ophard Bledsoe, Akron, Ohio

Application December 30, 1949, Serial No. 136,090

3 Claims. (Cl. 15—160)

This invention relates to cleaner devices generally, especially to a device which is adapted to support an article such as a meat grinder plate for aiding in effecting a cleaning action thereon.

Nearly every butcher shop in existence has a meat grinder machine as part of its equipment. These machines are used every day for grinding meat into particles, and substantially all of these machines, if not all of them, have some kind of feeder hopper or bell provided for receiving the meat pieces, and this hopper feeds meat down into a substantially enclosed conveyor screw which in turn moves and forces the meat towards a grinder plate which is stationarily positioned at the end of the conveyor screw. Any suitable drive means are provided for the conveyor screw, and this usually is manually operated. The conveyor screw ultimately forces the meat through the stationary grinder plate which has a multitude of relatively small bores or holes therethrough for effecting the actual grinding action on the meat, together with the rotary motion of the end of the conveyor screw. Obviously particles of meat remain in the holes in the meat grinder plate and naturally should be removed from the grinder plate at the conclusion of each day's business in order to prevent such meat from spoiling in the machine. Also, various particles of meat become stuck in different corners and crevices of the machine, and these particles likewise should be removed each day to prevent spoilage thereof and contamination of meat the next time the machine is to be used. It has been very difficult to clean these meat grinder machines because the interior of the machine is difficult to reach with a cleaning rag or cleaning brush as now available, whereas the meat grinder plate itself is particularly difficult to clean because of the large number of holes therein. Individually forcing the meat out of the different holes in the meat grinder plate obviously is a tedious and time-consuming operation.

The general object of the present invention is to provide a new type of cleaner device for use in the cleaning of meat grinder machines.

Another object of the invention is to provide a cleaner device which can be used to clean a meat grinder plate or the like rapidly and efficiently.

Yet another object of the invention is to provide a device for using in cleaning a meat grinder plate or the like wherein such device can easily be engaged with and disengaged from the cleaner device.

Yet another object of the invention is to provide a brush in combination with the cleaner device, which brush has both operative and inoperative positions and which can be locked in both of such positions, as desired.

A further object of the invention is to provide a device for use in cleaning a meat grinder plate or the like wherein special brush means are associated with the device and are particularly suited for cleaning remote regions of a meat grinder machine.

A further object of the invention is to provide a sturdy, relatively inexpensive, easily assembled device of the class described, which device can be used to facilitate the disassembly of a meat grinding machine.

The foregoing and other objects and advantages of the invention will be made more apparent as the specification proceeds.

For a better understanding of the present invention, reference should be had to the accompanying drawings, which show several embodiments of the invention, and wherein:

Fig. 1 is a perspective view of a cleaner device of the invention;

Fig. 2 is a fragmentary elevation of the head portion of the device of Fig. 1;

Fig. 3 is a fragmentary vertical section taken on line 3—3 of Fig. 2;

Fig. 4 is a fragmentary elevation of a modification of the device of the invention;

Fig. 5 is a fragmentary vertical section taken on line 5—5 of Fig. 4;

Fig. 6 is a fragmentary elevation of a further modification of the device of the invention; and Fig. 7 is a fragmentary vertical section taken on line 7—7 of Fig. 6.

In referring to the accompanying drawings and the following specification, corresponding numerals will be used to refer to corresponding parts whereby correlation of such parts is facilitated.

Now attention is directed to the details of the structure shown in the drawings, and a cleaner device is indicated generally by the numeral 10. This cleaner device might be considered a support for use in a cleaning operation, or more broadly speaking, the device could be called a cleaner and will generally be referred to hereinafter as a cleaner. The cleaner 10 includes a pair of substantially straight, elongate arms 11 and 12 which are secured together in pivotal relation by use of a rivet 13 or similar means which extend through both of the arms 11 and 12 adjacent corresponding ends thereof.

The arm 12 of the cleaner is shown as having a flat faced aligning member, or backing plate 14 secured thereto by means such as a rivet 15. Usually the backing plate 14 is of disc shape, for a reason to be explained hereinafter in more detail and it has a slot 16 provided therein and extending transversely thereof with relation to the arm 12 and its longitudinal axis. Each of the arms 11 and 12 have an end portion 17 and 18, respectively, that is flanged or turned or bent outwardly with relation to the longitudinal axis of each of these arms and with such end portion extending more or less radially from the longitudinal axis of such arm. The end portions 17 and 18 may be of reduced width with relation to the remainder of the arms 11 and 12 and these end portions are so formed on the arms with relation to the pivotal connection therebetween that the end portions 17 and 18 are superimposed or immediately aligned when the arms 11 and 12 are spread apart. However, by moving the arms 11 and 12 toward a generally superimposed position, the ends 17 and 18 will be expanded and such action is utilized to engage the arms 11 and 12 with a meat grinder plate 19, or the like. This meat grinder plate 19 is indicated in the drawings and it includes a center bore 20 with which the end portions 17 and 18 would engage. It will be noted that the slot 16 limits the relative pivotal movement between the arms 11 and 12.

The cleaner device 10 can be used to aid in the disassembly of a meat grinder machine. This action of the cleaner device 10 is provided by means of jaw portions 21 that are formed on each of the arms 11 and 12 on adjacent surfaces thereof. These jaws 21 can be brought into engagement with a shaft of a meat grinder machine which usually is exposed readily in disassembly of a machine and then the shaft can be drawn out axially from the machine even though it has meat particles wedged tightly thereon since the arms 11 and 12 provide a ready device for engaging with such shaft and pulling it from the machine.

Yet another important element of the present cleaner device is that a rigid cleaner finger 22 is formed on or suitably secured to the arm 11 and extends substantially normally therefrom. This finger 22 can be used for cleaning any individual bores or holes in the plate 19 which may have particles of bone or other solid matter therein which is now readily removed therefrom by the usual operation of the cleaner device of the invention.

In meat grinding machines, usually there is some kind of a lock ring which engages with the discharge end of the machine and aids in retaining the meat grinder plate in position. In order to clean the threads of this ring, the backing plate 14 is provided with a special little cleaning brush 23 that has a solid base 24 provided therefor which is pivotally secured to the backing plate 14 by a rivet 25 or the like. Usually the threads for retaining the locking ring on a meat grinder machine are internal threads and thus the backing plate 14 is made of conventional diameter for fitting snuggly inside the bore of a meat grinding machine and thus the brush 23, which can be swung to a position extending substantially radially from the backing plate 14, can be used to clean these internal threads of the machine. Of course, the brush still can readily be used to clean external threads in case such are actually formed in the meat grinder machine. Usually the brush 23 is provided with a cover plate 26 that is secured to the backing plate 14 and snuggly receives the brush 23 thereunder when the brush is moved to its inoperative position. The end of the arm 11 which is adjacent the brush 23 can be swung to a position tightly thereagainst when the arm 11 is superimposed on the arm 12 and this moves the end portion 17 to the extremity of the slot 16 and has such end portion lying adjacent the brush 23. Hence the brush 23 is capable of being locked in inoperative position, whereas when the brush is moved to its operative position, the arm 11 can be swung to the end of the slot 16 and be engaged with a slot 27 provided in the base 24 used to mount or position the brush 23. Again the brush 23 would be locked only this time in its operative position. If desired, the brush 23 may be made from wire or other suitable material, although cleaning bristles or the like may be used as desired. Use of wire bristles is particularly preferred for this particular brush since it is subjected to severe use when the cleaner device is utilized.

In order to clean remote interior regions of a meat grinding machine, brushes 28 and 29 are removably secured to the remaining ends of the arms 11 and 12. Usually these brushes 28 and 29 have suitable solid base portions associated therewith through which screws 30 extend for securing such brushes to the arms 11 and 12 but which screws permit replacement of the brush units 28 and 29 when worn out. Obviously these brushes may be made from suitable material and usually one of the brush units extend axially from the arms whereas at least one of the brush units has brush means associated therewith which extend substantially radially from the arm positioning such brush unit.

A modified type of cleaner device of the invention is shown in Figs. 4 and 5 wherein a pair of opposed locking flanges are provided for engaging with a meat grinding plate or similar article by a positive retention action. This cleaner device is indicated in general by the numeral 30 and it includes a pair of arms 31 and 32 that are pivotally secured together and with a backing plate 33 being secured to the arm 32. This backing plate 33 has a substantially inverted L-shaped overhanging flange 34 provided on one peripheral portion thereof. The arm 31 is suitably engaged with a lock plate 35 which has a slot 36 provided therein through which a pivot or screw 37 extends to secure the lock plate 34 to the backing plate 33 but permit relative sliding movement therebetween. The lock plate 35 is suitably engaged with the end or other portion of the arm 31 and is movable therewith whereby a locking flange 38, usually similar in shape and construction to the locking flange 34, can be moved into and away from engaging relationship to such flange 34 and effectively secure or grasp the meat grinder plate positioned therebetween. Of course, the locking flange 38 is opposed to the flange 34. These flanges 34 and 38 could usually grasp an article even though the overhanging portions thereof would be removed although such sections usually are present to facilitate a positive engagement with an article to be grasped.

Yet a further type of cleaner device 40 embodying the principles of the invention is shown in Figs. 6 and 7 and this device primarily is made from an arm 41 which has an overturned end portion 42 provided thereon. The cleaner device 40 engages with a meat grinder plate or the like, indicated at 43, by the end portion 42 being inserted into the bore of the plate 43 and a relatively short lock arm 44 is pivotally secured to the arm 41 by means of a rivet 45 or equivalent device. This lock arm 44 has an offset portion 46 provided thereon which terminates in a boss 47 that is adapted to overlie and be positioned adjacent the end portion 42 of the arm 41. This boss 47 is adapted to engage with the remaining end of the bore of the grinder plate 43 whereby a positive grasp can be secured on the plate 43.

The actual cleaning action on meat grinder plates when using the devices of the invention, is best achieved by pounding or striking the meat grinder plate vigorously against some type of a solid article, such as a meat pounding block that is present in all butcher shops. Such knocking or striking of the meat grinter plates against the solid article effects a rapid and thorough cleaning or removal of meat particles from the individual bores provided in the meat grinder plate. Usually the meat in the meat grinder plate may be softened or loosened slightly by inserting such clogged meat grinder plate into hot water for a short period of time immediately prior to the action of striking or knocking the meat particles therefrom.

From the foregoing description, it will be seen that a sturdy, yet inexpensive handle or grasping device is provided for use in the cleaning of meat grinder plates or similar articles. The cleaner device of the invention serves as a handle when pounding a meat grinder plate against an article to remove particles from holes in the plate by inertia. The plate 19 may be turned over and lie against the backing plate 14 instead of being spaced therefrom as shown in Fig. 3. The device is particularly adapted for cleaning different portions of a meat grinder machine and the device is of such size and shape as to easily and readily be grasped by hand for manual cleaning operations. Even remote interior portions of a grinder can easily be reached and cleaned by use of the brushes 28 and 29. Hence it is submitted that the objects of the invention have been realized.

While several complete embodiments of the invention have been disclosed herein, it will be appreciated that modification of these particular embodiments of the invention may be resorted to without departing from the scope of the invention as defined by the appended claims.

What I claim is:

1. A cleaner for a meat grinder plate or the like comprising a pair of flat straight elongate arms having end portions protruding substantially normally in the same direction from planes defined by the arms for engaging a meat grinder plate, means pivotally securing said arms together for movement to bring said ends into spaced or superimposed positions, and a backing plate having a slot therein secured to one of said arms with said end portions extending therethrough, said backing plate being adapted to have a meat grinder plate lie flush thereagainst to be reinforced thereby when a so positioned meat grinder plate is pounded against an article by use of said elongate arms as a handle.

2. In a cleaner, a pair of elongate arms, means pivotally securing said arms together, each of said arms having an end portion protruding out in the same direction from the longitudinal axis of the arm, said arms being movable to superimposed positions with said end portions then being spaced relatively widely apart for engagement with the bore of an article to be cleaned, said end portions being aligned and closely adjacent each other when said arms are moved to an acute angle with each other, a slotted backing plate disc secured to one of said arms with said end portions extending through said slot, and a brush pivotally secured to said disc and engageable by one of said arm end portions to be retained thereby in a given position.

3. A cleaner as in claim 2 wherein said brush has a frame with a slot therein and said end portion of one arm engages said slot in the frame of said brush to secure said brush in operative position.

References Cited in the file of this patent

UNITED STATES PATENTS

| Number | Name | Date |
|---|---|---|
| 505,835 | Kulp | Oct. 3, 1893 |
| 514,799 | Wildt | Feb. 13, 1894 |
| 1,024,047 | Whipple | Apr. 23, 1912 |
| 1,287,229 | Chromy | Dec. 10, 1918 |
| 1,541,197 | Stein | June 9, 1925 |
| 1,560,441 | Trosper | Nov. 3, 1925 |
| 2,226,317 | Myers | Dec. 24, 1940 |